(No Model.) 3 Sheets—Sheet 3.
U. DE GÜNZBURG & J. TCHERNIAC.
APPARATUS FOR MAKING SULPHO-CYANIDES.
No. 319,239. Patented June 2, 1885.
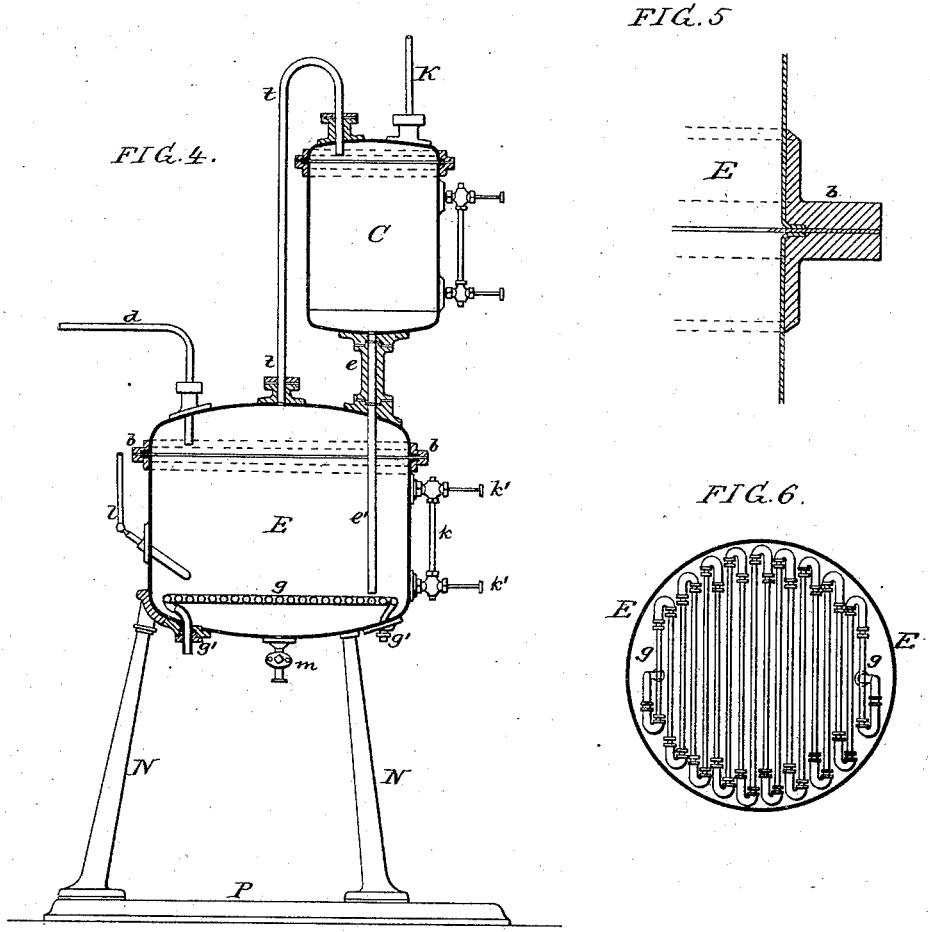

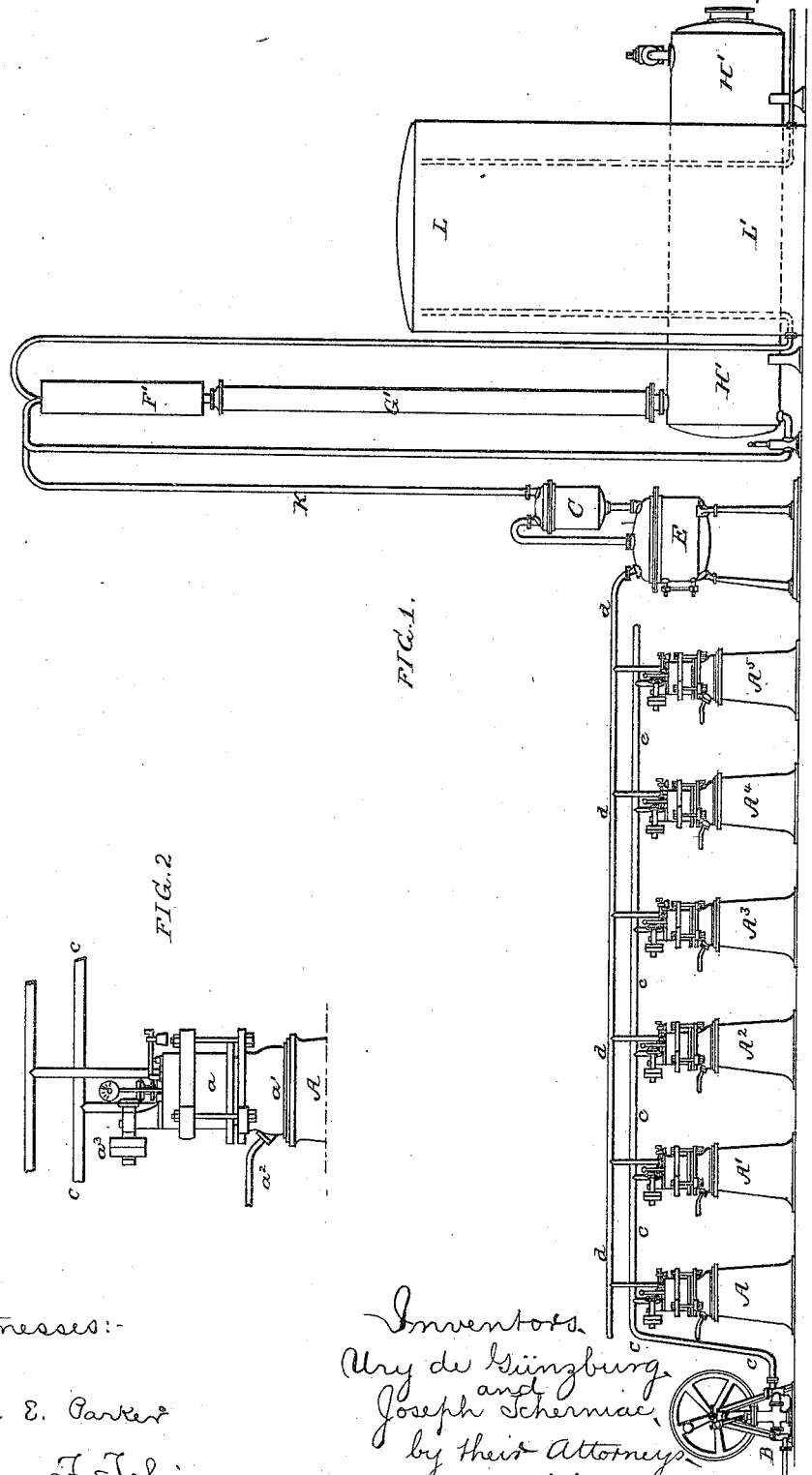

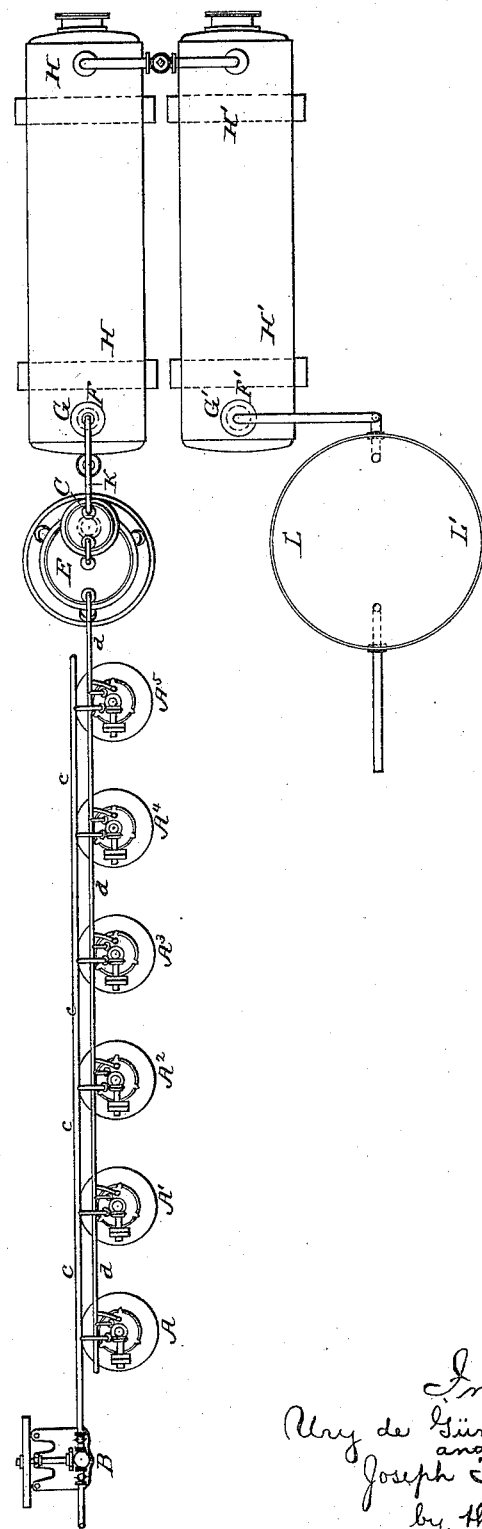

UNITED STATES PATENT OFFICE.

URY DE GÜNZBURG AND JOSEPH TCHERNIAC, OF PARIS, FRANCE.

APPARATUS FOR MAKING SULPHO-CYANIDES.

SPECIFICATION forming part of Letters Patent No. 319,239, dated June 2, 1885.

Application filed December 26, 1882. (No model.) Patented in France December 24, 1880, No. 140,327; in Belgium March 19, 1881, No. 54,158; in Italy March 21, 1881, No. 12,733; in England March 22, 1881, No. 1,261; in Germany April 10, 1881, No. 16,005; in Spain June 30, 1881, No. 1,470, and in Austria September 26, 1881, No. 10,053.

*To all whom it may concern:*

Be it known that we, Baron URY DE GÜNZBURG and JOSEPH TCHERNIAC, both citizens of the Republic of France, and residents of Paris, France, have invented certain Improvements in Apparatus for the Manufacture of Sulpho-Cyanide of Ammonia, of which the following is a specification.

Our invention consists of an apparatus for producing sulpho-cyanide of ammonia, as fully described and claimed hereinafter.

The following are the principal features of the apparatus we employ:

First. A force-pump in iron analogous to those which are employed in the manufacture of ice by the ammonia process.

Second. A series of heating-vessels in wrought-iron, and proved to a high pressure. Each vessel is provided with a stirrer, a manometer, a thermometer, and three cocks, intended one to allow the entrance of liquids coming from the pump, another to permit, as required, the passage of the gases accumulated in the vessel, and the third for emptying. The heating-vessels are surrounded for about three-quarters of their height by a steam-jacket. They communicate by a system of pipes with the pump and with a still. The manometer, the flexible part of which ought to be of iron or platinum, is provided with a tube which enters the liquid. Without this precaution they are soon rendered false by the deposition of the sulphide of ammonia on the diaphragm in the curved tube.

Third. A still heated by a steam-coil. This still is surmounted by a cylindrical vessel, which constitutes an important part of it, and which we call the "separator." This vessel is intended to effect a complete separation between the vapor coming from the still and the solution carried over in a frothy state. A glance at the drawings, Figure 3, will suffice to show the apparatus. The frothy vapor is carried over by a tube of about twenty centimeters which enters the reservoir. It there separates completely into steam, ammoniacal gas, and sulphureted hydrogen on one side, which all escape by a tube placed in the top of the separator, while the particles of liquid carried over reunite and return to the still by a pipe which extends nearly to the bottom thereof.

Fourth. A surface-condenser of any system surrounded by a column of coke and situated above a spacious receiver. A small force-pump raises the liquid in the receiver and throws it in a continuous rain on the top of the column of coke. This pump, by causing a current of liquid to pass through the condenser, insures the complete condensation of the ammoniacal vapor and prevents obstruction caused by the crystallization of the sulphide of ammonia.

Fifth. A second receiver provided with a condenser and column of coke analogous to the preceding, but arranged in reverse, and which insures the retention of any liquid portions which may be carried over.

Sixth. A gas-holder capable of containing about twenty-five cubic meters, and which takes the office of a regulator.

In the accompanying drawings, Fig. 1, Sheet 1, is a view of the apparatus in general elevation. Fig. 2 is a view drawn to a larger scale of a portion of one of the heating-vessels. Fig. 3, Sheet 2, is a general plan view of the apparatus, Fig. 1. Fig. 4, Sheet 3, is a vertical section of the still and separator drawn to a larger scale. Fig. 5 is a sectional plan of the still; and Fig. 6 is an enlarged sectional view of the joint for the body and cover of the still.

Referring to Figs. 1, 2, and 3, A A' A², &c., are the heating-vessels in which the action is produced, there being six of these vessels illustrated in the present instance. Each of these heaters, as shown in Fig. 2, consists of a vessel, $a$, provided with an inlet and an outlet pipe for the fluid, a manometer, thermometer, and cocks to regulate the flow of the fluid. Within each chamber is a stirrer, which may be of any suitable character—such as illustrated in our Patent of December 9, 1879, for instance—this stirrer to be driven by bevel-gearing and pulleys $a^3$. Around the lower part of the mixing-vessel $a$ is a heating-chamber, $a'$, to which steam is admitted through a pipe, $a^2$.

B is the force-pump for feeding the heating-vessels with ammonia and sulphide of carbon;

*c c c c*, pipes for conveying the liquor to the heating-vessels; *d d d d*, pipes for conveying to the still the products of the reaction; E E, the still for distilling the products of the reaction; F, coke-cylinder; G, condenser; H H H' H', receivers into which the gaseous products of the distillation pass; G', condenser placed on the second receiver; F' F', coke-cylinder placed above the second reservoir; L L', gas-holders.

Referring now to Figs. 4, 5, and 6, E is the still proper, which we prefer to make of aluminium, and which is provided with a dismountable cover. *b b* are the joints formed by the iron-flanged rings, which are tightened up, with india-rubber between, by means of bolts. The edges of the aluminium still and the cover are bent outward, so as to form flanges all round, which are gripped between the iron rings. The object of this arrangement of joints is to prevent the exposure of any portion of the iron rings to the attack of the contents of the still. This joint may also be adopted generally in the apparatus, and in order that it may be more clearly understood we have shown it on an enlarged scale at Fig. 6. The products of distillation pass through the pipe *t t* from the still to the separator. The sockets of the pipes *t t* are riveted to the cover of the still proper and to the cover of the separator. The joints between the sockets and the pipes may be made in any convenient and suitable manner.

C is the separator. It is carried by a short hollow column, *e*, secured to the cover of the still. This column must also be made of aluminium, and it is intended as the means of communication between the still and its separator, when any liquid particles carried over may be returned to the still.

*e'* is a pipe, which forms a continuation of the hollow column *e*, and reaches almost to the bottom of the still.

K is the pipe by which the products of distillation pass off.

*d* is the pipe by which the materials to be treated are introduced into the still.

*g* is the heating-coil with the socket or couplings *g'*, through which the steam enters and leaves the coil.

*k* is a liquid-gage. The metal-work of this gage is of aluminium, and it is provided with the removable parts *k' k'*, which will allow of the gage being cleaned.

*l l* is a thermometer, which is inserted in the body of the still.

*m* is the emptying-cock.

N N are the supports of the apparatus, and P is the base-plate.

The operation is as follows: The pump feeds the heating-vessels with sulphide of carbon, ammonia, and a certain quantity of ammoniacal liquor proceeding from the condensation of the water of distillation from the still. As soon as one vessel has received its charge the inflow-cock is closed and the agitator or stirrer is put in motion. The liquid is heated by means of steam until the thermometer placed in a tube filled with oil and plunged in the liquid registers 120° to 130° centigrade. The steam is then shut off, and the agitation is continued until the manometer indicates fifteen atmospheres. At this moment, the operation being nearly terminated, the agitation is stopped and the emptying-cock is opened. The liquid escapes by a tube, which extends to the bottom of the heating-vessel and enters the still. The liquid may be raised to higher pressures, or may be maintained for a lengthened time at a pressure of fifteen atmospheres by opening occasionally the cock which gives exit to the gas. The liquids coming from the heating-vessels, the ammoniacal solutions of sulpho-carbonate of ammonia, reunite in the still and are there heated to 110° centigrade. At this temperature the sulpho-carbonate of ammonia decomposes entirely into sulphureted hydrogen and sulpho-cyanide of ammonia. A small quantity of sulphide of carbon is regenerated and distills with the vapor. This latter is composed of sulphureted hydrogen, sulphide of ammonia, sulphide of carbon, and water. During its passage through the condensers and receivers it leaves there the sulphide of carbon, (principally in the state of carbon disulphide,) while the sulphureted hydrogen alone passes to the gas-holder, from whence it is directed either to a furnace to be converted into sulphurous acid or to alkaline lyes, which absorb it. The solutions of sulpho-cyanide of ammonia concentrated in the still at 105° and 110° centigrade are evaporated at 125°, if it is desired to obtain crystal.

If it be desired to obtain crystals of sulpho-cyanide of ammonia pure, which will remain white on exposure to air, and from liquids proceeding from an iron still and consequently charged with iron salt, the solutions should be treated before being evaporated in a tin vessel, or better in aluminium, by the sulphide of ammonia. The waters of distillation of the still serve perfectly for this object. A small quantity of this is added to the cold solutions, and they are then intimately mixed. All the iron is precipitated in the state of sulphide of iron. The liquid, clarified by standing or filtration, is evaporated, as above said, and is then cooled in the crystallizing-vessels of tin or lined with tin. The crystals obtained are perfectly pure and white.

We claim as our invention—

The herein-described apparatus for making sulpho-cyanide of ammonia, said apparatus consisting of a pump, B, heating and mixing vessels A A', &c., still E, separator C, condenser, receiver, and gas-holder, all substantially as specified.

In testimony whereof we have signed our names to this specification in the presence of two subscribing witnesses.

URY DE GÜNZBURG.
    JOSEPH TCHERNIAC.

Witnesses:
 ALFRED COINY,
 EDWARD P. MACLEAN.